(12) United States Patent
Yamada

(10) Patent No.: US 7,945,363 B2
(45) Date of Patent: May 17, 2011

(54) VEHICLE CONTROL SYSTEM

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 1123 days.

(21) Appl. No.: 11/708,153

(22) Filed: Feb. 19, 2007

(65) Prior Publication Data
US 2007/0198156 A1 Aug. 23, 2007

(30) Foreign Application Priority Data
Feb. 20, 2006 (JP) .................... 2006-042182

(51) Int. Cl.
G05D 1/00 (2006.01)
B60R 22/00 (2006.01)
E05F 15/00 (2006.01)
G05D 3/00 (2006.01)

(52) U.S. Cl. ........................................................ 701/49

(58) Field of Classification Search .................. 362/459, 362/464, 465, 466, 487, 507; 340/988; 701/49
See application file for complete search history.

(56) References Cited

U.S. PATENT DOCUMENTS

| | | | | |
|---|---|---|---|---|
| 4,893,246 A * | 1/1990 | Iihoshi et al. | ................. | 701/208 |
| 5,276,451 A | 1/1994 | Odagawa | | |
| 5,345,388 A | 9/1994 | Kashiwazaki | | |
| 5,562,336 A * | 10/1996 | Gotou | ........................... | 362/466 |
| 6,049,749 A * | 4/2000 | Kobayashi | ..................... | 701/49 |
| 6,254,259 B1 * | 7/2001 | Kobayashi | ..................... | 362/465 |
| 6,459,387 B1 * | 10/2002 | Kobayashi et al. | ........... | 340/988 |
| 6,609,817 B2 * | 8/2003 | Niwa et al. | .................... | 362/466 |
| 6,817,740 B2 * | 11/2004 | Kobayashi et al. | ........... | 362/466 |
| 7,344,288 B2 * | 3/2008 | Kobayashi et al. | ........... | 362/466 |
| 2002/0080618 A1 | 6/2002 | Kobayashi et al. | | |
| 2005/0027419 A1 | 2/2005 | Horii et al. | | |
| 2005/0134440 A1 * | 6/2005 | Breed | ............................ | 340/435 |
| 2005/0253738 A1 * | 11/2005 | Kobayashi et al. | ........... | 340/988 |

(Continued)

FOREIGN PATENT DOCUMENTS
DE 101 64 193 7/2002
(Continued)

OTHER PUBLICATIONS

Office action dated May 7, 2008 in German Application No. 10 2007 007 321.8 with English translation.

(Continued)

*Primary Examiner* — John Q Nguyen
*Assistant Examiner* — Nicholas Kiswanto
(74) *Attorney, Agent, or Firm* — Harness, Dickey & Pierce, PLC

(57) ABSTRACT

A storage device stores map data, which indicates a road map, and a reliability of the map data. A navigation controller determines an absolute position of a vehicle based on signals of a GPS sensor, a gyrosensor and a vehicle speed sensor. The controller sets a sensing accuracy of the absolute position based on a sensing condition, under which the absolute position is sensed. The controller stores the absolute position at the time of traveling of the vehicle as travel path information of the vehicle in the storage device. The controller sets a reliability of the travel path information based on the sensing accuracy of the absolute position. A light controller controls headlights based on a road state that is determined according to a selected one of the travel path information and the corresponding map data, which shows the higher reliability.

3 Claims, 4 Drawing Sheets

U.S. PATENT DOCUMENTS

2007/0198177 A1 * 8/2007 Yamada ........................ 701/208

FOREIGN PATENT DOCUMENTS

| DE | 102 54 806 | 6/2004 |
| JP | 2000-230835 | 8/2000 |
| JP | 2004-136868 | 5/2004 |
| JP | 2004-309152 | 11/2004 |
| JP | 2004-347069 | 12/2004 |
| JP | 2005-084024 | 3/2005 |
| JP | 2005-147713 | 6/2005 |
| JP | 2005-326196 | 11/2005 |
| JP | 2005-332041 | 12/2005 |

OTHER PUBLICATIONS

Office action dated Sep. 29, 2009 in corresponding Japanese Application No. 2006-042182.

* cited by examiner

VEHICLE CONTROL SYSTEM

CROSS REFERENCE TO RELATED APPLICATION

This application is based on and incorporates herein by reference Japanese Patent Application No. 2006-42182 filed on Feb. 20, 2006.

BACKGROUND OF THE INVENTION

1. Field of the Invention

The present invention relates to a vehicle control system, which performs a vehicle control operation in conformity with a road state.

2. Description of Related Art

In a navigation system, an absolute position of a vehicle is sensed based on both of absolute positioning data and relative positioning data. The absolute positioning data is obtained by satellite navigation, which uses a GPS sensor. The relative positioning data is obtained by dead-reckoning navigation, which uses, for example, a gyrosensor and a vehicle speed sensor. A current position of the vehicle is displayed on a road map, which is indicated by map data. When an error exists in the road map, which is indicated by the map data, relative to the actual road, the absolute position of the vehicle does not coincide with the road map, which is indicated by the map data. Therefore, in the navigation apparatus, the position of the vehicle is corrected to coincide with the road map, which is indicated by the map data. That is, a map-matching operation is performed to obtain the position of the vehicle on the basis of the road map, which is indicated by the map data. As described above, in the navigation apparatus, the position of the vehicle is adjusted and is displayed to coincide with the road map. Thus, even in an area where the road map, which is indicated by the map data, differs significantly from the actual road, the position of the vehicle can be displayed in conformity with the road.

In recent years, it has been proposed to perform a vehicle control operation according to a road state through use of the navigation apparatus. For example, Japanese Unexamined Patent Publication JP-A-2005-59839 (corresponding to US 2005/0027419 A1) teaches a system, which adjusts optical axes of headlights of the vehicle according to a road state (a road extending direction on a vehicle front side), which is determined based on a road map that is indicated by map data. In such a system that adjusts the optical axes of the headlights according to the road state determined based on the road map, which is indicated by the map data, the optical axes of the headlights may be controlled in a manner that is not consistent with the actual road state in an area (e.g., a mountain road) of a relatively low accuracy where the accuracy of the road map, which is indicated by the map data, is relatively low. Therefore, in the system recited in Japanese Unexamined Patent Publication JP-A-2005-59839, the optical axis of only one of the left and right headlights is adjusted according to the road state that is determined based on the road map, which is indicated by the map data.

In the system recited in Japanese Unexamined Patent Publication JP-A-2005-59839, which adjusts the optical axis of only one of the left and right headlights according to the road state that is determined based on the road map, which is indicated by the map data, the level of the deterioration in the optical axis control operation in the above-described area of the relatively low accuracy can be reduced to a half level. However, the advantages of the optical axis control operation may be disadvantageously reduced to a half level in an area of a relatively high accuracy in the road map, which is indicated by the map data.

SUMMARY OF THE INVENTION

The present invention is made in view of the above disadvantages. Thus, it is an objective of the present invention to provide a vehicle control system, which can achieve an improved vehicle control operation according to a road state.

To achieve the objective of the present invention, there is provided a vehicle control system, which includes a map data storing means, an absolute position sensing means, a travel path storing means and a vehicle controlling means. The map data storing means is for storing map data and a reliability of the map data. The map data indicates a road map. The reliability of the map data is stored in association with the map data and corresponds to an error of the road map, which is indicated by the map data and is determined on a basis of an actual road. The absolute position sensing means is for sensing an absolute position of a vehicle and also for setting a sensing accuracy of the sensed absolute position of the vehicle based on a sensing condition, under which the absolute position of the vehicle is sensed. The travel path storing means is for storing the absolute position of the vehicle, which is sensed by the absolute position sensing means at a time of traveling of the vehicle, as travel path information of the vehicle. The travel path storing means is also for setting and storing a reliability of the travel path information based on the sensing accuracy of the absolute position of the vehicle, which is set by the absolute position sensing means, and the reliability of the travel path information is stored in association with the travel path information. The vehicle controlling means is for performing a vehicle control operation based on a road state that is determined according to a selected one of the travel path information and the corresponding map data, which corresponds to the travel path information. The selected one of the travel path information and the corresponding map data has the reliability, which is higher than the reliability of the other one of the travel path information and the map data.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A vehicle control system according to an embodiment of the present invention will be described with reference to FIGS. 1 to 4. The vehicle control system of the present embodiment includes a navigation apparatus as its main component.

Figure 1:
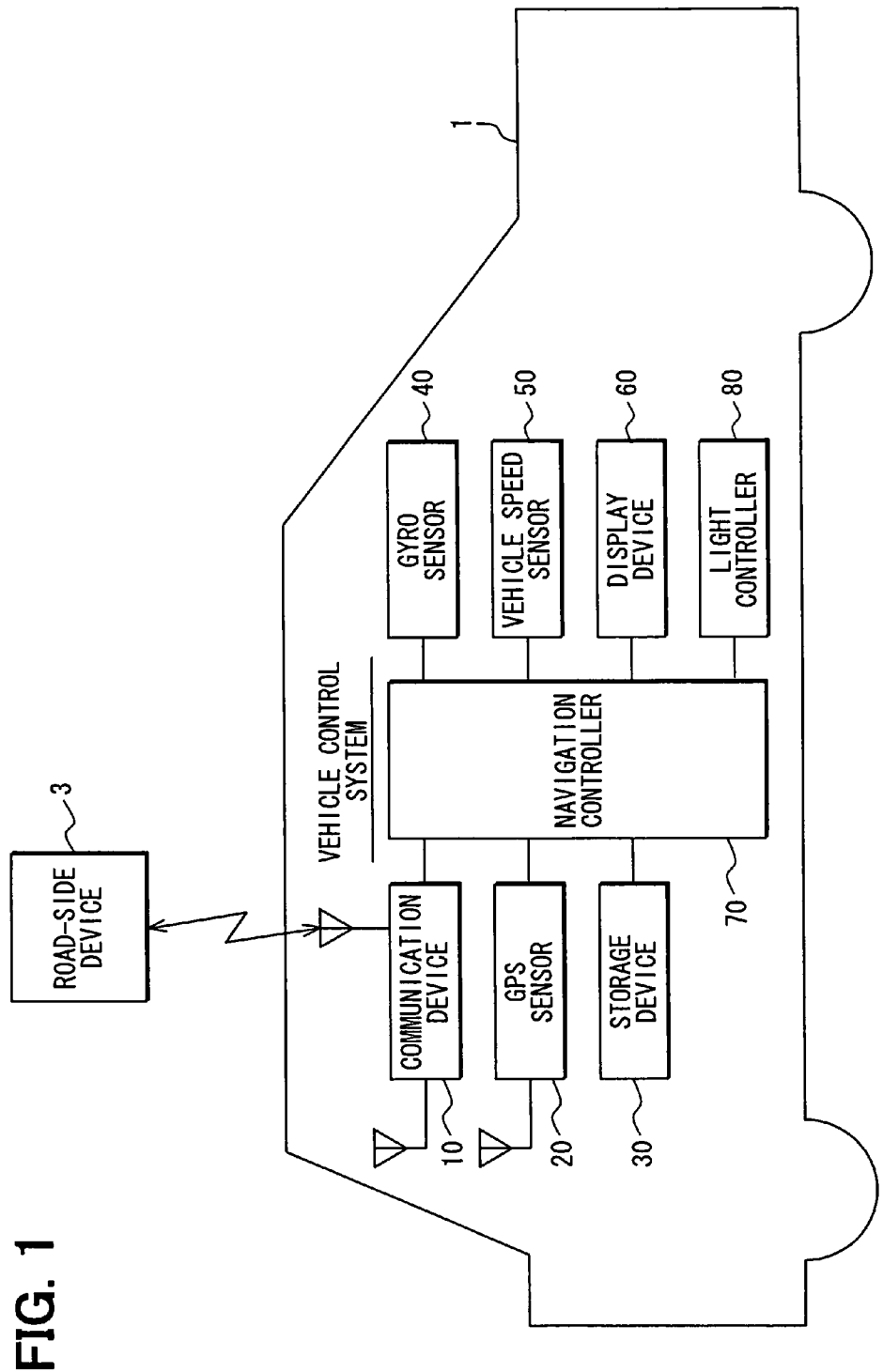
FIG. 1 is a block diagram showing a schematic structure of a vehicle control system according to an embodiment of the present invention.

FIG. 1 is a block diagram, which shows a schematic structure of the vehicle control system of the present embodiment. As shown in FIG. 1, the navigation apparatus includes a communication device 10, a GPS sensor 20, a gyrosensor 40, a vehicle speed sensor 50, a display device 60, a navigation controller 70 and a light controller 80.

The communication device 10 has a function of receiving information from road-side devices 3 (only one is shown in FIG. 1), which are arranged one after another along a road, through a short-range radio communication. The communication device 10 further has a function of communicating through a communication network, such as an internet, via the road-side device 3 or a base station (not shown). Each road-side device 3 transmits the information, which includes absolute position information (a latitude, a longitude and an altitude) of a location of the road-side device, to the vehicle control system.

The GPS sensor 20 receives radio signals from global positioning system (GPS) satellites and senses an absolute position (a latitude, a longitude and an altitude) of the vehicle 1. The GPS sensor 20 periodically performs the above absolute position sensing operation for sensing the absolute position of the vehicle 1.

The storage device 30 is a storage medium, which stores various types of information. The storage device 30 is capable of writing and reading the various types of information. The storage device 30 of the present embodiment includes, for example, a hard disk drive (HDD) or a memory device. The storage device 30 may be constructed to retrieve map data from a magnetic disk (e.g., a flexible disk), a magneto-optical disk or a portable storage (e.g., a semiconductor storage medium).

The storage device 30 stores the map data (an electronic map), which indicates a road map. A reliability of the map data is set for each predetermined interval to indicate a degree of accuracy of the map data. The degree of accuracy of the map data indicates an amount of deviation of a road configuration on the road map, which is indicated by the map data, relative to a road configuration of an actual road. In the present embodiment, the reliability of the map data is digitized. Specifically, a numeric value of the reliability of the map data is set such that when a degree of an error in the map data is decreased, the numeric value of the reliability of the map data is increased. In contrast, when the degree of the error in the map data is increased, the numeric value of the reliability of the map data is decreased. More specifically, when the error in the map data is less than ±1 m, the reliability is 100. When the error in the map data is equal to or greater than ±1 m but is less than ±5 m, the reliability is 80. When the error in the map data is equal to or greater than ±5 m but is less than ±10 m, the reliability is 60. Furthermore, when the error in the map data is equal to or greater than ±10 m, the reliability is 40.

Here, the error in the map data may be obtained as follows. That is, the absolute position of the actual road in each of predetermined intervals is compared with the corresponding position on the map data to obtain a corresponding error. Then, an average value of the errors at the respective comparison points is obtained as the error in the map data. Alternatively, the error in the map data may be obtained based on the absolute position of the actual road and a correlation value of the map data with respect to the absolute position of the actual road.

Furthermore, when the vehicle 1 actually travels along the road, the storage device 30 of the present embodiment stores information of the travel path of the vehicle 1 as the travel path information. The travel path information includes an aggregation of absolute positions (the latitudes, the longitudes and the altitudes) of the vehicle in the respective predetermined intervals in a specific section on the road map, which is indicated by the map data. The travel path information is correlated with the map data. The travel path information includes information with respect to an error in the sensing of the absolute position of the vehicle 1.

The gyrosensor (an angular speed sensor) 40 senses a traveling direction of the vehicle and outputs a measurement signal, which corresponds to an angular velocity that is applied to the vehicle. The vehicle speed sensor 50 outputs pulse signals at corresponding intervals, which correspond to a traveling speed of the vehicle 1. The display device 60 displays various types of information, such as the road map, which is indicated by the map data. Furthermore, the display device 60 may be in a form of a liquid crystal display device.

The navigation controller 70 includes a microcomputer as its main component to control the above-described components 10-60. The microcomputer includes a CPU, a ROM, a RAM, an I/O device and a bus line for interconnecting these devices. The navigation controller 70 performs an absolute position sensing operation for sensing the absolute position of the vehicle 1 based on the measurement signals received from, for example, the GPS sensor 20, the gyrosensor 40 and the vehicle speed sensor 50. The navigation controller 70 also performs a map-matching operation for correcting the position of the vehicle 1 to coincide with the road map, which is indicated by the map data that is stored in the storage device 30. Also, the navigation controller 70 performs a displaying operation for displaying the road map, which is indicated by the map data, and also the position of the vehicle 1 obtained after the map-matching operation. In addition, the navigation controller 70 performs a guiding operation for guiding the vehicle 1 along a best route from the current position of the vehicle 1 to a destination. Furthermore, the navigation controller 70 performs a reliability setting operation for setting the reliability of the absolute position of the vehicle. Also, the navigation controller 70 performs a storing operation for storing the travel path of the vehicle 1 in the storage device 30.

The light controller 80 includes a microcomputer as its main component. The microcomputer of the light controller 80 includes a CPU, a ROM, a RAM, an I/O device and a bus line for interconnecting these devices. The light controller 80 is interconnected with the navigation controller 70 through a communication line to communicate with the navigation controller 70. The light controller 80 performs an optical axis control operation for controlling optical axes of left and right headlights 1a (FIGS. 2B and 2C) of the vehicle 1 based on the information, which is transmitted from the navigation controller 70. The light controller 80 of the present embodiment performs its control operation based on the road state information, which is transmitted from the navigation controller 70.

Figure 2A:
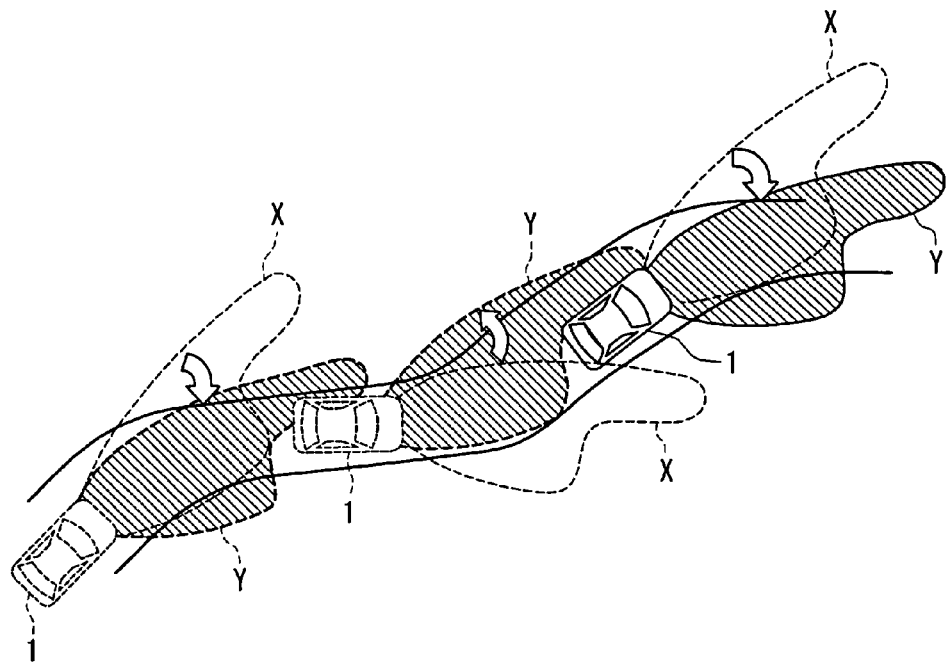
FIGS. 2A to 2C are diagrams for describing an optical axis control operation of headlights, which is executed by a light controller according to the embodiment.
Figure 2B:
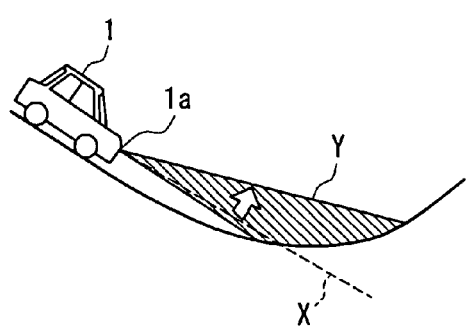
Figure 2C:
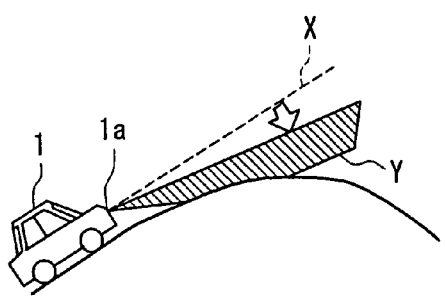

FIGS. 2A to 2C are diagrams for describing the optical axis control operation of the headlights 1a, which is performed by the light controller 80. The light controller 80 performs the optical axis control operation based on the road state (a road extending direction, which indicates an extending direction of a front road located in front of the vehicle 1). For instance, when the front road is a right curve, the light controller 80 adjusts the optical axes of the headlights 1a in a right direction (FIG. 2A). In this way, an adjusted light distribution Y of the headlights 1a is implemented instead of an unadjusted light distribution X of the headlights, which would occur in a conventional vehicle that does not have the vehicle control system of the present embodiment. Similarly, when the front road is a left curve, the light controller 80 adjusts the optical axes of the headlights 1a in a left direction (FIG. 2A). When the front road is an ascending road, the light controller 80 adjusts the optical axes of the headlights 1a in an ascending direction (FIG. 2B). When the front road is a descending road, the light controller 80 adjusts the optical axes of the headlights 1a in a descending direction (FIG. 2C).

Figure 3:
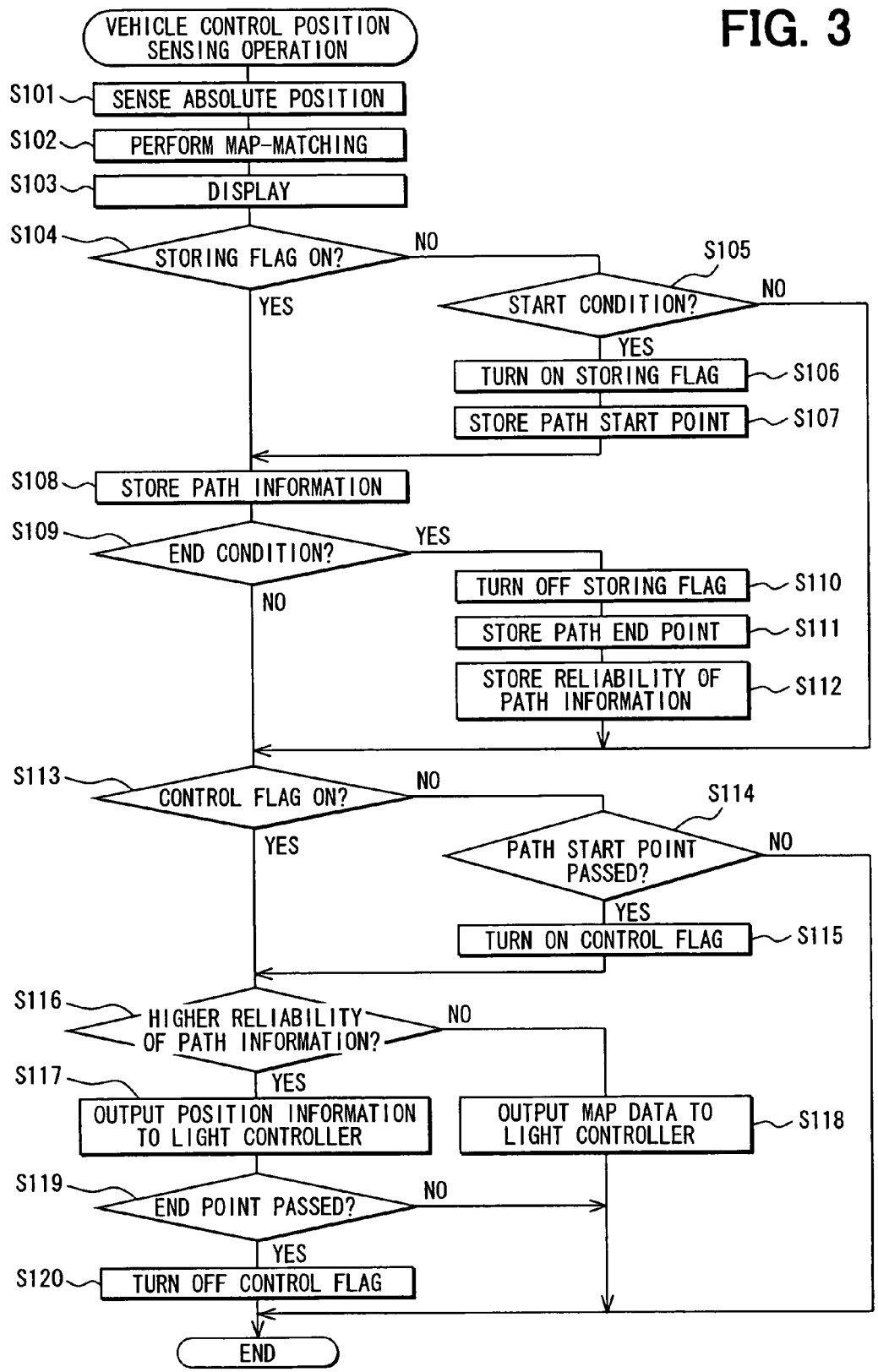
FIG. 3 is a flowchart showing a flow of a vehicle control position sensing operation of the embodiment.
Figure 4:
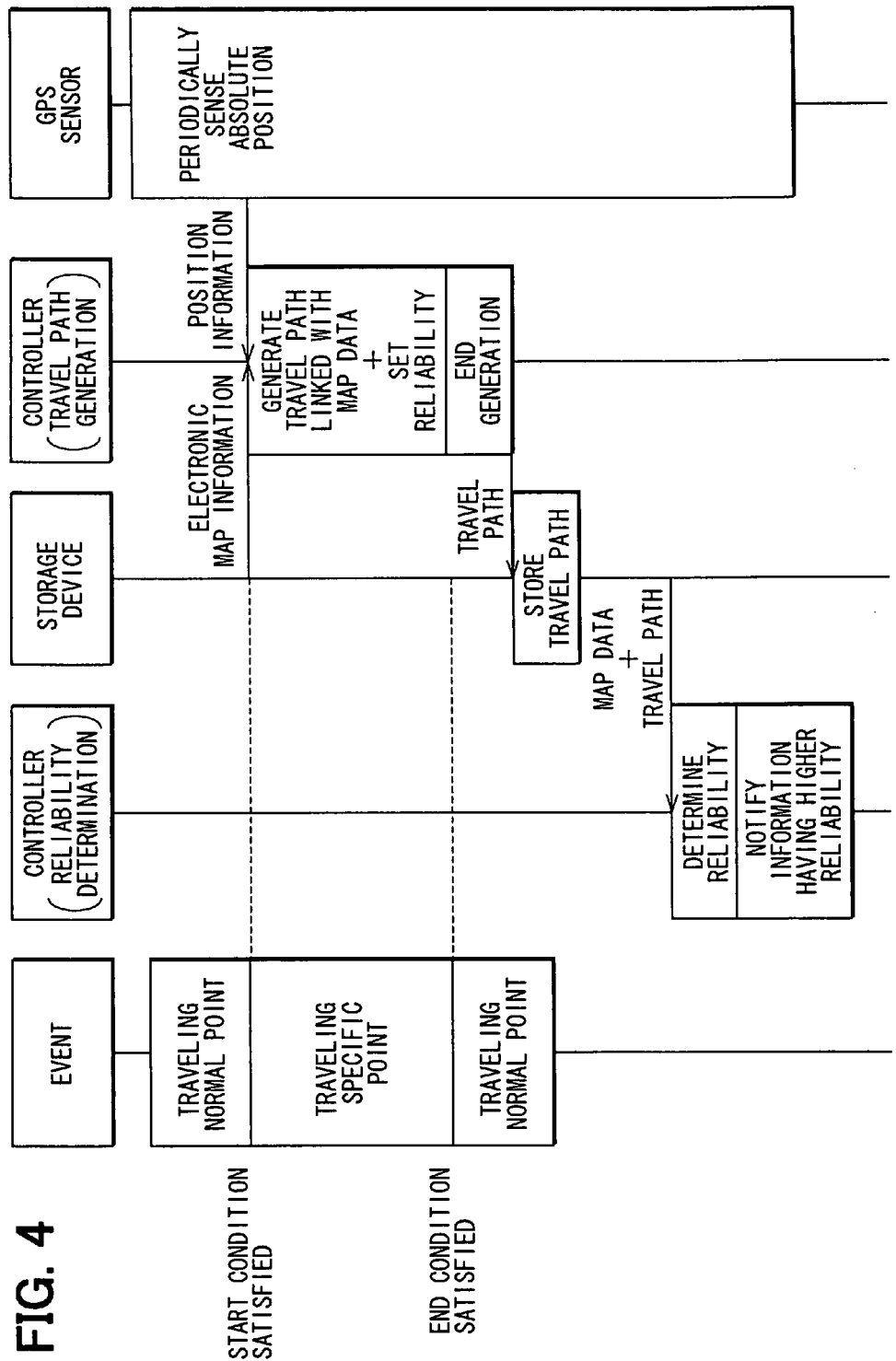
FIG. 4 is a timing chart showing a relationship among a controller, a storage device and a GPS sensor in the vehicle control position sensing operation.

Next, a vehicle control position sensing operation, which is performed by the vehicle control system of the present embodiment, will be described. FIG. 3 is a flowchart showing a flow of the vehicle control position sensing operation, which is executed by the navigation controller 70 according to a program stored in, for example, the ROM. FIG. 4 is a timing chart, which chronologically indicates a relationship among the navigation controller 70, the storage device 30 and the GPS sensor 20 in the vehicle control position sensing operation. In FIG. 4, a normal point is a travel region where the travel path of the vehicle 1 should not be stored, and a specific point is a travel region where the travel path of the vehicle 1 should be stored. The vehicle control position sensing operation is executed periodically (e.g., every 200 ms) during the traveling of the vehicle.

First, the current absolute position (the latitude, the longitude and the altitude) of the vehicle 1 is sensed at step S101. The sensing of the absolute position of the vehicle 1 is performed based on both of absolute positioning data and relative positioning data. The absolute positioning data is obtained through satellite navigation based on the measurement signals received from the GPS sensor 20. The relative positioning data is obtained through dead-reckoning navigation based on the measurement signals, which are received from the gyrosensor 40 and the vehicle speed sensor 50. Furthermore, in a case where the sensing of the absolute position of the vehicle 1 through the GPS sensor 20 is impossible due to a non-receiving state of the signals from the satellites, the sensing of the absolute position of the vehicle 1 through the road-side device(s) 3 is carried out. Specifically, in the case where the road-side device 3 is located adjacent to the vehicle 1, the navigation controller 70 commands the communication device 10 to perform a communication operation for obtaining the absolute position information (the latitude, the longitude and the altitude of the location where the road-side device 3 is placed), which is stored in the road-side device 3, from the road side device 3.

Next, at step S102, the map-matching operation is performed such that the current position of the vehicle 1, which is sensed at step S101, is corrected to coincide with the road map, which is indicated by the map data stored in the storage device 30 and thereby to obtain the position of the vehicle 1 on the basis of the road map, which is indicated by the map data. Next, at step S103, based on the position of the vehicle 1 obtained after the map-matching operation, the road map, which is indicated by the map data, and the current position of the vehicle 1 are displayed on the display device 60.

Then, it is determined whether a path storing flag is in an ON state at step S104. The path storing flag is a flag, which indicates whether the travel path of the vehicle 1 must be stored. Specifically, in the state where the travel path of the vehicle 1 must be stored, the path storing flag is placed in the ON state at step S106. In contrast, in the state where the travel path of the vehicle 1 must not be stored, the path storing flag is placed in an OFF state at step S110. The ON/OFF state of the path storing flag is stored in the RAM of the navigation controller 70 and is retained until the engine of the vehicle 1 is stopped.

When it is determined that the path storing flag is not in the ON state (i.e., is in the OFF state) at step S104 (NO at step S104), the navigation controller 70 proceeds to step S105. At step S105, it is determined whether a state for starting the storing of the travel path of the vehicle 1 is reached. In other words, it is determined whether a travel path storing condition (a start condition) for starting the storing of the travel path is satisfied. Specifically, it is determined whether the current state is the state, in which the travel path of the vehicle 1 must be stored. In this instance, when one of the following conditions (A) and (B) is satisfied simultaneously with satisfaction of one of the following conditions (C) and (D), it is determined that the start condition is satisfied.

(A) A correction amount in the map-matching operation at step S102 is larger than a predetermined reference value (in other words, it is presumed that there is a large erroneous difference between the road map, which is indicated by the map data, and the actual road).

(B) The position of the vehicle 1 is in a predetermined area. Here, the predetermined area is set as an area, in which a high-accident location, a dangerous location or the like exits.

(C) The current condition permits the sensing of the absolute position of the vehicle 1 through the GPS sensor 20, or a travel distance of the vehicle 1 from a location, at which the sensing of the absolute position of the vehicle 1 through the GPS sensor 20 is possible, is less than a predetermined travel distance. The predetermined travel distance is set to be a distance, within which a satisfactory level of accuracy of the position of the vehicle 1 can be maintained through the dead-reckoning navigation.

(D) The current condition permits the obtaining of the absolute position information from the road-side device 3, or a travel distance of the vehicle 1 from a location, at which the absolute position information is obtained from the road-side device 3, is less than a predetermined travel distance. The predetermined travel distance is set to be a distance, within which a satisfactory level of accuracy of the position of the vehicle 1 can be maintained through the dead-reckoning navigation.

In the case where the travel path storing condition is satisfied at step S105 (YES at step S105), the travel path storing flag is placed in the ON state at step S106. In this way, the operation is shifted from the normal point to the specific point in FIG. 4.

Next, at step S107, the map data is obtained, i.e., is retrieved from the storage device 30, and the current position of the vehicle 1 is stored as a travel path start point, which indicates a start point of the travel path. Then, the navigation controller 70 proceeds to step S108.

Returning to step S104, when it is determined that the travel path storing flag is in the ON state (YES at step S104), the navigation controller 70 proceeds to step S108.

At step S108, the absolute position of the vehicle 1, which is sensed at step S101, and a predicted error of the GPS sensor 20 are stored as travel path information in the storage device 30. The travel path information is stored in association with the latest travel path start point that has been stored in the storage device 30. Here, the predicted error of the GPS sensor 20 is a value that indicates an accuracy of the absolute position of the vehicle 1, which is measured by the GPS. The predicted error may be measured through various ways. In the present embodiment, the predicted error of the GPS sensor 20 is determined based on a sensing condition, i.e., is determined based on the number of the GPS satellites, from which the GPS sensor 20 receives the signals. When the number of the GPS satellites is increased, the measurement error is reduced, and thereby the predicted error of the GPS sensor 20 is also reduced. Specifically, when the GPS sensor 20 receives the signals from three GPS satellites, the predicted level of the error is set to be "large". When the GPS sensor 20 receives the signals from four GPS satellites, the predicted level of the error is set to be "middle". When the GPS sensor 20 receives the signals from five GPS satellites, the predicted level of the error is set to be "small". When the GPS sensor 20 receives the signals from six or more satellites, the predicted level of the error is set to be "extremely small". The reason why the predicted level of the error is reduced as the number of the GPS satellites gets larger is due to the following fact. That is, when the number of the GPS satellites is relatively large, a better combination of the signals from the satellites for achieving the higher accuracy can be selected.

At step S108, when the travel path information of the current travel road is already present in the storage device 30, a renewing operation for renewing the absolute position of the vehicle 1, which is in conformity with the predicted level of the error of the GPS sensor 20, is performed. That is, when the previously predicted level of the error, which has been already registered, i.e., has been stored in the storage device 30, is larger than the currently predicted level of the error, the absolute position of the vehicle 1 is renewed. In contrast, when the previously predicted level of the error is smaller than the currently predicted level of the error, the absolute position of the vehicle is not renewed. Here, it should be noted that when the previously predicted level of the error and the currently predicted level of the error are the same, the absolute position of the vehicle 1 may be renewed or may not be renewed. However, in such a case, an average value of the previously computed absolute position of the vehicle 1 and the currently computed absolute position of the vehicle 1 may be obtained, and this average value may be used to renew the previously computed absolute position of the vehicle 1. In this way, the absolute position of the vehicle 1 may be changed to the more accurate one.

Next, at step S109, it is determined whether a condition (end condition) for terminating the storing of the travel path of the vehicle 1 is satisfied. That is, it is determined whether the current state is the state, in which the travel path of the vehicle 1 must not be stored. Specifically, the end condition is satisfied when both of the following conditions (E) and (F) are satisfied or when both of the following conditions (G) and (H) are satisfied.

(E) The correction amount in the map-matching operation at step S102 is smaller than the predetermined reference value (in other words, it is presumed that there is a relatively small erroneous difference between the road map, which is indicated by the map data, and the actual road).

(F) The current vehicle position is outside of the predetermined area, which is described with respect to the condition (B).

(G) The current condition does not permit the sensing of the absolute position of the vehicle 1 through the GPS sensor 20, and a travel distance of the vehicle 1 from the location, at which the sensing of the absolute position of the vehicle 1 through the GPS sensor 20 is possible, is equal to or greater than the predetermined distance.

(H) The current condition does not permit the obtaining of the absolute position information from the road-side device 3, and a travel distance of the vehicle 1 from the location, at which the absolute position information is obtained from the road-side device 3, is equal to or greater than the predetermined travel distance.

In the case where it is determined that the end condition is satisfied at step S109 (YES at step S109), the travel path storing flag is placed in the OFF state at step S110. In this way, the operation is shifted from the specific point to the normal point in FIG. 4.

Next, at step S111, the map data is obtained, i.e., is retrieved from the storage device 30, and the current position of the vehicle 1 is stored as a travel path end point, which indicates an end point of the travel path. In this way, the travel path information is obtained for the interval from the travel path start point, which is stored at step S107, to the travel path end point, which is stored at step S111.

Next, at step S112, the reliability of the travel path information is stored in the storage device 30 as a travel path reliability. Specifically, similar to the travel path end point, even in the case of the travel path start point, which has been already present in the storage device 30, the travel path start point should be stored in view of the current travel path start point. The reliability of the travel path information is determined based on the travel path information, which is stored in association with this travel path start point. In the present embodiment, the reliability of the travel path information is digitized. Specifically, when the travel path information contains at least one large predicted error, which has the "large" level described above, the level of the reliability is set to 40. When the travel path information contains at least one middle predicted error, which has the "middle" level described above, the level of the reliability is set to 60. When the travel path information contains at least one small predicted error, which has the "small" level described above, the level of the reliability is set to 80. When the travel path information does not contain any of the large predicted error, the middle predicted error and the small predicted error, i.e., when the travel path information contains only the relatively small ignorable predicted error(s), the level of the reliability is set to 100. The level 100 of the reliability corresponds to the accuracy of less than ±1 m. The level 80 of the reliability corresponds to the accuracy of equal to or greater than ±1 m but is less than ±5 m. The level 60 of the reliability corresponds to the accuracy of equal to or greater than ±5 m but is less than ±10 m. Furthermore, the level 40 of the reliability corresponds to the accuracy of equal to or greater than ±10 m.

Then, it is determined whether a vehicle control flag is in an ON state at step S113. Here, the vehicle control flag is a flag, which indicates whether the optical axis control operation of the headlights 1a must be performed by the light controller 80. Specifically, when the current state requires the optical axis adjustment, the vehicle control flag is placed in an ON state at step S115. Thereafter, when the current state no longer requires the optical axis adjustment, the vehicle control flag is placed in an OFF state at step S120. The ON/OFF state of the vehicle control flag is stored in the RAM of the navigation controller 70 and is retained until the engine of the vehicle 1 is stopped.

When it is determined that the vehicle control flag is not in the ON state, i.e., when it is determined that the vehicle control flag is in the OFF state at step S113 (NO at step S113), the navigation controller 70 proceeds to step S114. At step S114, it is determined whether the vehicle 1 has passed the travel path start point, which is stored in the storage device 30, i.e., whether the condition for executing the optical axis control operation is satisfied. Specifically, when it is determined that the vehicle 1 has passed the travel path start point (in a case where multiple travel path start points are stored in the storage device 30, this particular travel path start point may be any of the multiple travel path start points) and has entered the travel path, which is indicated by the travel path information that is stored in association with this particular travel path start point based on the position of the vehicle obtained after the map-matching process at step S102 (the position of the vehicle 1 on the basis of the road map, which is indicated by the map data), it is determined that the vehicle 1 has passed the travel path start point at step S114.

When it is determined that the vehicle 1 has not passed the travel path start point, which is stored in the storage device 30 (NO at step S114), the current vehicle control position sensing operation is terminated. In contrast, when it is determined that the vehicle 1 has passed the travel path start point, which is stored in the storage device 30 (YES at step S114), the vehicle control flag is placed in the ON state at step S115. Then, the navigation controller 70 proceeds to step S116.

When it is determined that the vehicle control flag is in the ON state at step S113 (YES at step S113), the navigation controller 70 proceeds to step S116.

Next, at step S116, the reliability of the travel path information, which is set upon the actual traveling of the vehicle along the road, is compared with the preset reliability of the map data to determine whether the reliability of the travel path information is higher than the reliability of the map data. That is, the reliability of the travel path information that is stored in association with the travel path start point, through which the vehicle 1 has passed, is compared with the reliability of the corresponding map data. At step S116, the value of the reliability of the travel path information is compared with the value of the reliability of the map data, and one of the travel path information and the map data, which shows the higher value of the reliability than other one, is determined to be the more reliable and more accurate information. When it is determined that the reliability of the travel path information is higher than the reliability of the map data at step S116 (YES at step S116), the travel path information is transmitted to the light controller 80 at step S117.

In contrast, when it is determined that the reliability of the travel path information is not higher than the reliability of the map data, i.e., when it is determined that the reliability of the map data is higher than the reliability of the travel path information (NO at step S116), the map data is transmitted to the light controller 80 at step S118.

At step S117 or S118, one of the travel path information and the map data, which is required in the optical axis control operation of the headlights 1a (the information about the front road state that is in front of the vehicle 1), is outputted. In this way, the light controller 80 determines the road state based on the one of the travel path information and the map data and performs the optical axis control operation according to the determined road state.

Next, at step S119, it is determined whether the vehicle 1 has passed the travel path end point, which is stored in the storage device 30, i.e., it is determined whether the current state no longer requires the optical axis control operation. Specifically, when it is determined that the vehicle 1 has passed the travel path end point (the travel path end point, which is stored in association with the previously passed travel path start point) stored in the storage device 30 based on the current position of the vehicle 1 obtained after the map-matching operation at step S102 (the position of the vehicle 1 on the basis of the road map, which is indicated by the map data), it is determined that the vehicle 1 has passed the travel path end point at step S119.

When it is determined that the vehicle 1 has not passed the travel path end point, which is stored in the storage device 30 (NO at step S119), the current vehicle control position sensing operation is terminated.

In contrast, when it is determined that the vehicle 1 has passed the travel path end point, which is stored in the storage device 30, at step S119 (YES at step S119), the vehicle control flag is placed in the OFF state at step S120. Thereafter, the current vehicle control position sensing operation is terminated.

As described above, in the vehicle controller of the present embodiment, the absolute position of the vehicle 1, which is sensed at the time of traveling of the vehicle 1, is stored as the travel path information. The vehicle control operation is performed based on the road state, which is determined based on the one of the travel path information and the map data, which shows the higher reliability. In this way, at the location (e.g., metropolitan) where the accuracy of the map data is relatively high, the information of this map data is used to perform the vehicle control operation. Also, at the other location (e.g., suburb or mountain-ringed region) where the accuracy of the map data is relatively low, the travel path information is used to perform the vehicle control operation. In this way, the effective vehicle control operation can be performed.

Furthermore, in the vehicle control system of the present embodiment, the travel path information is stored in association with the position of the vehicle 1 that is on the basis of the road map. Thus, it is possible to determine whether the travel path information that corresponds to the road, along which the vehicle 1 currently travels, exits in a simple and reliable manner.

Furthermore, in the navigation apparatus of the present embodiment, the travel path information is stored only in the following state. That is, the vehicle 1 travels the location where the road map, which is indicated by the map data, differs significantly from the actual road (the location where the accuracy of the road map, which is indicated by the map data, is relatively low), or the vehicle 1 travels the specific area where the need for the vehicle control operation is relatively high (e.g., the high-accident location, the dangerous location), and the absolute position of the vehicle 1 can be obtained at the relatively high accuracy. Thus, it is possible to limit the storing of the travel path information in the state where the travel path information, which has the higher accuracy than the road map indicated by the map data, cannot be obtained.

In the present embodiment, the storage device 30 corresponds to a map data storing means of the invention. The GPS sensor 20, the gyrosensor 40 and the vehicle speed sensor 50 correspond to an absolute position sensing means of the invention. The navigation controller 70, which performs the operation at step S102, corresponds to a map position obtaining means of the invention. The navigation controller 70, which performs the operation at step S108, corresponds to a travel path storing means of the invention. The navigation controller 70, which performs the operation at step S105, corresponds to a travel path storing need determining means of the invention. The light controller 80 corresponds to a vehicle controlling means.

In the above embodiment, the optical axis control operation of the headlights is performed as the vehicle control operation, which is performed based on the travel path information or the map data. However, the present invention is not limited to this. For instance, the vehicle control operation may be a control operation for controlling a drive force of the vehicle 1, a control operation for controlling a braking force of the vehicle 1 or a control operation for controlling a vehicle air conditioning.

Additional advantages and modifications will readily occur to those skilled in the art. The invention in its broader terms is therefore not limited to the specific details, representative apparatus, and illustrative examples shown and described.

What is claimed is:

1. A vehicle control system comprising:
storing means for storing map data that indicates a road map and a reliability of the map data that is stored in association with the map data and corresponds to an error of the road map, which is indicated by the map data and is determined on a basis of an actual road;
means for sensing an absolute position of a vehicle and for setting a sensing accuracy of the sensed absolute position of the vehicle based on a sensing condition, under which the absolute position of the vehicle is sensed;
means for storing the absolute position of the vehicle which is sensed by the sensing means at a time of traveling of the vehicle, as travel path information of the vehicle, wherein the storing means is also for setting and storing a reliability of the travel path information based on the sensing accuracy of the absolute position of the vehicle which is set by the sensing means, and the reliability of the travel path information is stored in association with the travel path information;
means for performing a vehicle control operation based on a road state that is determined according to a selected one of the travel path information and the corresponding map data, which corresponds to the travel path information, wherein the reliability of the selected one of the travel path information and the corresponding map data is higher than the reliability of the other one of the travel path information and the corresponding map data;
means for obtaining a position of the vehicle on a basis of the road map, which is indicated by the map data stored in the storing means, based on the absolute position of the vehicle, which is sensed by the sensing means, wherein the storing means stores the travel path information in association with the position of the vehicle, which is obtained by the obtaining means on the basis of the road map; and
means for determining whether the travel path of the vehicle needs to be stored based on the position of the vehicle, which is obtained by the obtaining means on the basis of the road map, wherein when the determining means determines that the travel path of the vehicle needs to be stored, the storing means stores the travel path information; wherein
the obtaining means obtains the position of the vehicle on the basis of the road map by correcting the absolute position of the vehicle, which is sensed by the sensing means, to coincide with the road map that is indicated by the map data; and
the determining means determines that the travel path of the vehicle needs to be stored when a degree of the correction made by the obtaining means is larger than a determination reference condition.

2. A vehicle control system comprising:
storing means for storing map data that indicates a road map and a reliability of the map data that is stored in association with the map data and corresponds to an error of the road map, which is indicated by the map data and is determined on a basis of an actual road;
means for sensing an absolute position of a vehicle and for setting a sensing accuracy of the sensed absolute position of the vehicle based on a sensing condition, under which the absolute position of the vehicle is sensed;
means for storing the absolute position of the vehicle which is sensed by the sensing means at a time of traveling of the vehicle, as travel path information of the vehicle, wherein the storing means is also for setting and storing a reliability of the travel path information based on the sensing accuracy of the absolute position of the vehicle which is set by the sensing means, and the reliability of the travel path information is stored in association with the travel path information;
means for performing a vehicle control operation based on a road state that is determined according to a selected one of the travel path information and the corresponding map data, which corresponds to the travel path information, wherein the reliability of the selected one of the travel path information and the corresponding map data is higher than the reliability of the other one of the travel path information and the corresponding map data;
means for obtaining a position of the vehicle on a basis of the road map, which is indicated by the map data stored in the storing means, based on the absolute position of the vehicle, which is sensed by the sensing means, wherein the storing means stores the travel path information in association with the position of the vehicle, which is obtained by the obtaining means on the basis of the road map; and
means for determining whether the travel path of the vehicle needs to be stored based on the position of the vehicle, which is obtained by the obtaining means on the basis of the road map, wherein when the determining means determines that the travel path of the vehicle needs to be stored, the storing means stores the travel path information; wherein
the determining means determines that the travel path of the vehicle needs to be stored when the position of the vehicle, which is obtained by the obtaining means on the basis of the road map, is within a predetermined area on the road map.

3. The vehicle control system according to claim 1, wherein the vehicle control system includes means for controlling an optical axis of a headlight of the vehicle.

* * * * *